R. R. PRICE.
PLOW.
APPLICATION FILED JAN. 12, 1909.
961,895.
Patented June 21, 1910.
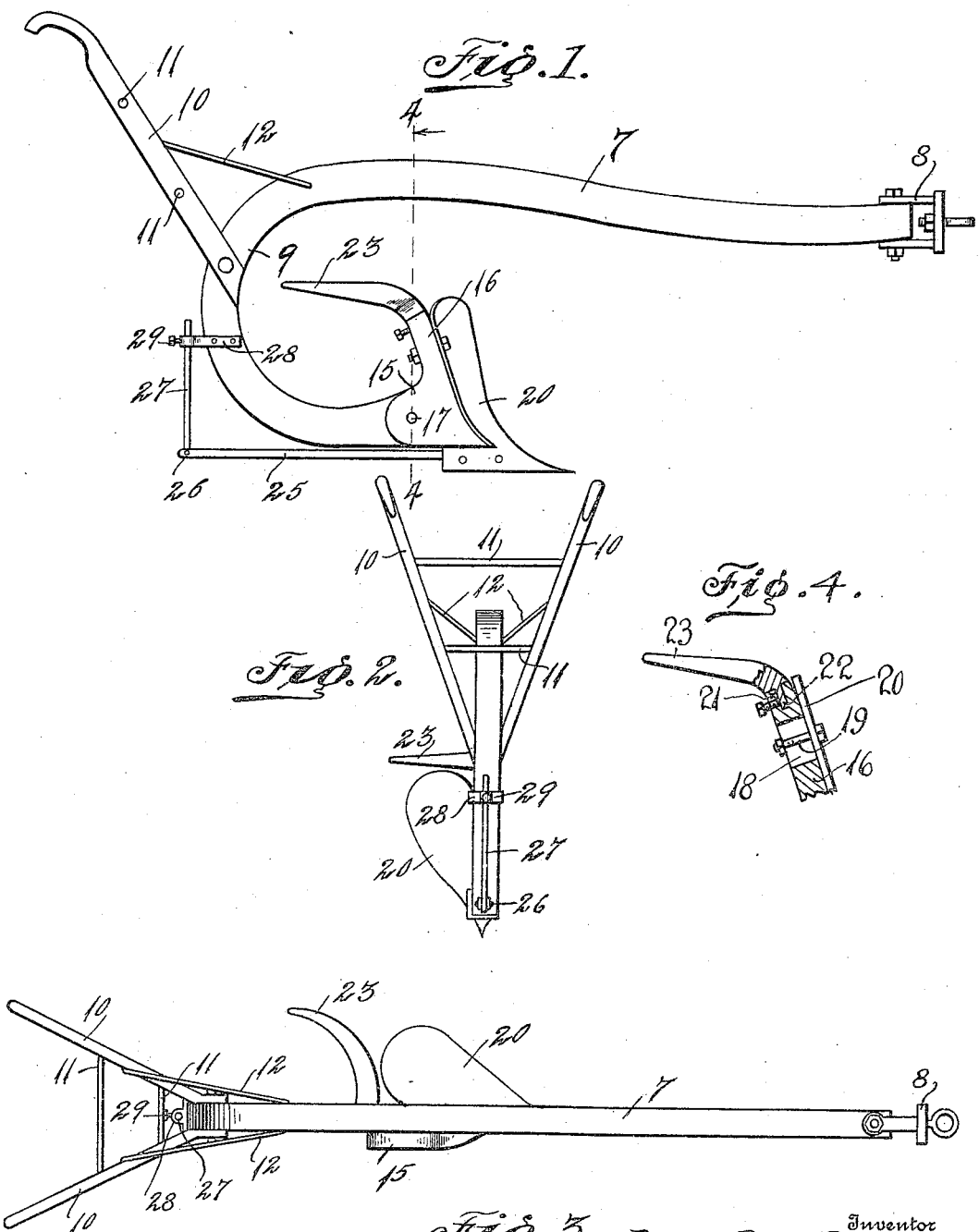

UNITED STATES PATENT OFFICE.

ROSCOE RAYE PRICE, OF TALLAHASSEE, FLORIDA.

PLOW.

961,895.    Specification of Letters Patent.    Patented June 21, 1910.

Application filed January 12, 1909. Serial No. 471,947.

*To all whom it may concern:*

Be it known that I, ROSCOE R. PRICE, a citizen of the United States, residing at Tallahassee, in the county of Leon, State of Florida, have invented certain new and useful Improvements in Plows; and I do hereby declare the following to be a full, clear, and exact description of the invention, such as will enable others skilled in the art to which it appertains to make and use the same.

The invention relates to a plow and more particularly to the class of plows having means for preventing the clogging of the plow during the use of the same for heavy work.

The primary object of the invention is the provision of a plow comprising a plow beam, a foot adjustably connected thereto and adapted to be regulated to permit deep or shallow plowing, a wing connected to said foot to prevent the soil or dirt from clogging the plow during its forward travel, and an adjustable shoe to steady the plow when in operation.

Another object of the invention is the provision of a plow having an angularly adjustable foot upon which the plow share is mounted, a deflector wing carried by the foot to prevent weeds, roots and dirt from clogging the plow during the advancement of the same, and means adjustably mounted upon the plow beam to steady the plow during its advancement over a field.
Another object of the invention is the provision of a plow which is simple in construction, thoroughly efficient in operation and inexpensive in the manufacture.

In the drawings accompanying and forming part of this specification is illustrated the preferred form of embodiment of the invention which to enable those skilled in the art to practice the invention, will be set forth at length in the following description, while the novelty of the invention will be brought out in the claim succeeding the description.

In the drawings: Figure 1 is a side elevation of the plow in accordance with the invention. Fig. 2 is a rear elevation thereof. Fig. 3 is a top plan view. Fig. 4 is a fragmentary side view of the plow standard and the wing attached thereto, the same being partly in section.

Similar reference characters indicate corresponding parts throughout the several views in the drawings.

In the drawings, the numeral 7 designates the plow or draft beam to the forward end of which is fixed a draft clevis 8 for the attachment of draft animals so that the plow can be drawn over a field. The rear portion of the plow or draft beam 7 is curved downwardly and forwardly as at 9 and to this curved portion is connected the handle bars 10 which latter diverge outwardly and are united by cross rungs 11 and to the plow beam and the handle bars are connected brace rods 12, to maintain and support the said handle bars in a rigid manner.

The plow foot 16 is connected by a bolt fastener 17 to the curved portion 9 of the plow beam. Contained in the plow foot 16 is a suitable slot receiving a bolt fastener 19 which adjustably connects a plow share 20 to the said foot. The bolt fastener 19 will permit the plow share to be vertically adjusted upon the foot 16 of the plow.

Formed in the upper end of the plow foot 16 is a socket 21 to receive a stud projection 22 formed on a deflector wing or plate 23 which latter is supported upon the foot in a substantially horizontal position in the rear thereof and is adapted to deflect trash such as vines, roots or dirt to one side of the downwardly curved portion of the plow beam 7 and thus prevent clogging of the said plow.

Connected by a pivot 24 to the lower end of the plow foot 16 and at its rear is a shoe 25 which latter extends rearwardly a distance and to its rear end is connected by a pivot 26 a rising stem or rod 27 the latter working or passing through a clip 28 encircling the curved portion 9 of the plow beam below the connection of the handles therewith. This clip is provided with a bolt fastener 29 which latter is adapted to lock the stem or rod 27 in the clip and to permit the adjustment of the said rod or stem to regulate the disposition of the shoe which latter is adapted to travel in the base of an open furrow so as to steady and guide the plow during its forward travel.

What is claimed is—

A plow of the class described comprising a plow beam, a foot carried by the beam and having a socket in its upper end, a curved deflector wing provided with a stud projection fitted in the socket of said foot, whereby the wing may horizontally swing to either side of the plow, and means holding the wing in its adjusted position.

In testimony whereof, I affix my signature, in presence of two witnesses.

ROSCOE RAYE PRICE.

Witnesses:
T. B. BRUCE,
HENRY E. BEARD.